(No Model.)
M. J. LORRAINE.
CAR COUPLING.
No. 341,026. Patented May 4, 1886.
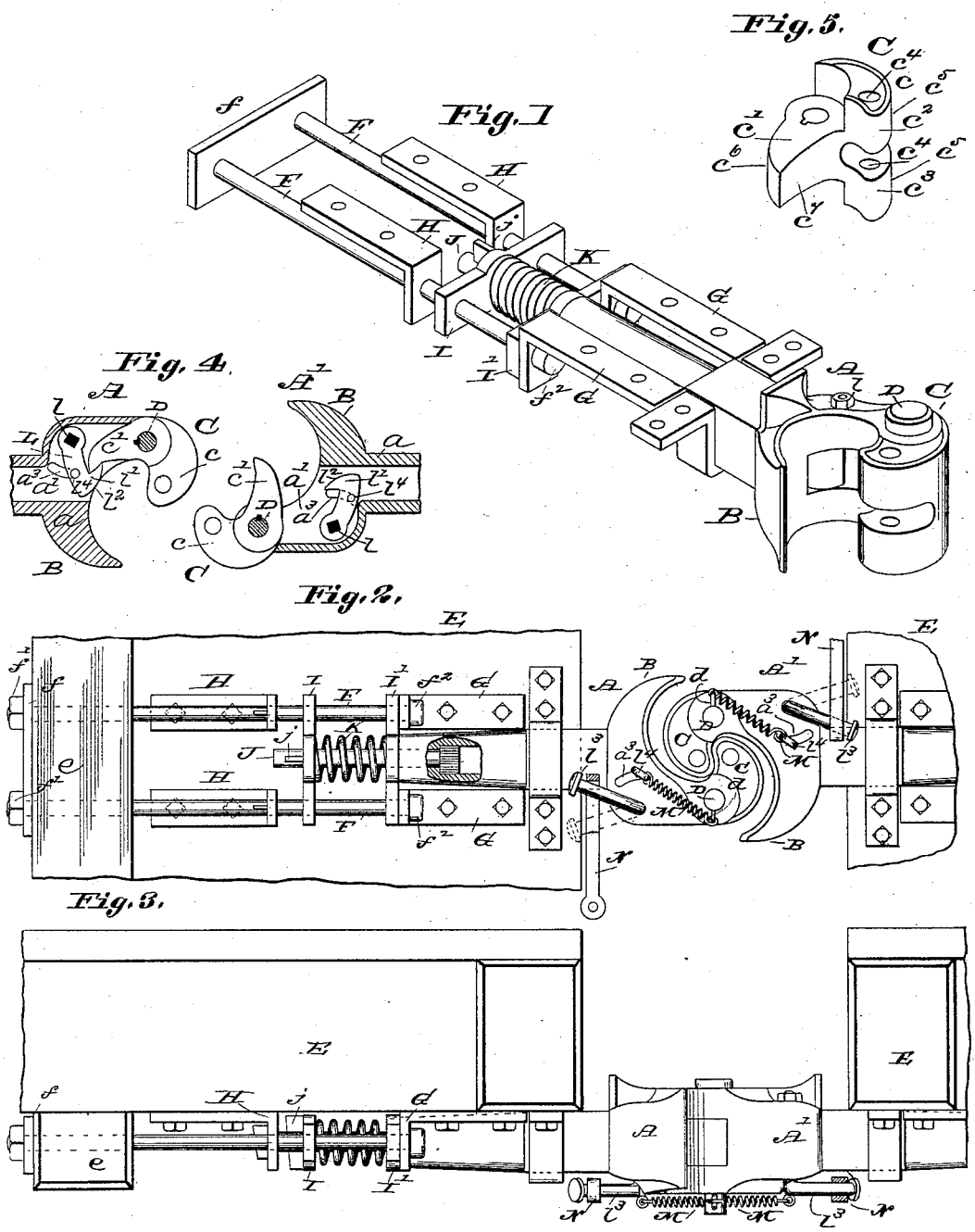
Attest:
Charles Pickles
J. W. Hoke.
Inventor:
Madison J. Lorraine
by C. D. Moody atty

UNITED STATES PATENT OFFICE.

MADISON J. LORRAINE, OF ST. LOUIS, MISSOURI.

CAR-COUPLING.

SPECIFICATION forming part of Letters Patent No. 341,026, dated May 4, 1886.

Application filed January 5, 1885. Serial No. 152,031. (No model.)

*To all whom it may concern:*

Be it known that I, MADISON J. LORRAINE, of St. Louis, Missouri, have made a new and useful Improvement in Car-Couplings, of which the following is a full, clear, and exact description.

The improvement relates to that class of car-couplings whose draw-bars have a projecting buffer, and whose heads are in the form of a pivoted hook.

In the drawings herewith, illustrating my invention, Figure 1 is a view in perspective of one of my couplers complete, with the mechanism designed to contribute to the efficacy of the coupler that I have devised for attachment of the draw-bar of the coupler to the body of the car. Fig. 2 is an under side view of two couplers engaged one with the other, as in service, and a portion of the bottom of a car, showing mode of attachment of draw-bar, &c., to a car. Fig. 3 is a side elevation of the two engaged couplers, and portion of car and attachments shown in Fig. 2. Fig. 4 is a horizontal longitudinal section of the draw-head of each of two opposing couplers, in one of which draw-heads the coupling-hook is shown locked in place, as when coupled with another such hook, and in the other draw-head the coupling-hook is shown unlocked and as thrown outward and open, in position to pass into the concave recess of the opposing draw-head in process of making a coupling with the locked hook thereof. Fig. 5 is a perspective view of a coupling-hook separate from all attachments.

Throughout the several figures aforesaid similar letters refer to similar parts.

The draw-bar of the coupler is connected with the body of a car, preferably by means of the mechanism shown in Figs. 1, 2, and 3, in which each of the two rods F F is passed through a bracket, G, thence through a bracket, H, and through a cross-timber, e, the timber and brackets, respectively, being suitably fixed on the bottom of a car. Each rod has a head, $f^2$, that bears on a bracket, G, and is fitted at its other extremity with a nut, $f'$, which nut sets upon the plate $f$, bearing on the timber e. Intermediately each rod is keyed back of one of the brackets H. The rods assist in holding the brackets G G in place against any pull exerted by the draw-bar. They serve also as guides for the plates I I', that, as shown, travel on these rods. The draw-rod J, that is attached to the draw-bar, passes through a perforation in each of the plates I I', and is keyed back of I by the key $j$. Between I and I' a spring, K, (preferably encircling the draw-rod,) is fixed. The inner end of the draw-bar abuts against I'. When the draw-bar is pulled outward, as in service, the spring K is compressed. When the draw-bar is pushed inward, it shoves I', the spring K, and the plate I along the rods F F until I encounters the brackets H H. A continuation of the push then compresses K against I, and finally thrusts J back to the limit of compressibility of K.

Arranged as shown and described, the draw-bar has a capacity for an extended "slack" movement—a condition not only favorable in starting heavy or a large number of cars, but whether applied to freight or passenger service such provision for slack movement is especially useful in a draw-head having a combined coupling-hook and buffer, in that coupling is thereby better assured. The rebound that takes place in consequence of an abrupt stop of the recession of the draw-heads (or either of them) when two cars come briskly together is by such provision avoided; hence the coupling acts more certainly.

The coupling-hook shown in Fig. 5 resembles in general form a bell-crank lever. The outer arm of it—the point $c$—engages with the like arm or point in the opposing draw-head. The inner arm or tail, $c'$, engages with the lock L, whereby the coupling-hook is held in the position in which such hook is shown in the draw-head on the left in Fig. 4, and in which each of the two engaged hooks is shown in Fig. 2.

The point of the coupling-hook has a slot in it for the reception of an ordinary coupling-link, which (when necessary to couple my draw-head with one of the ordinary type) is to be secured therein by means of a pin passed through the vertical perforation $c^4$.

To insure smooth and otherwise desirable and efficacious working of a coupling-hook when encountering an opposing buffer or part B of an opposing draw-head, (under conditions indicated in Fig. 4,) the face $c^5$ of the hook is appropriately shaped, as shown in Figs. 4 and 5. The back $c^6$ of the inner arm or tail of the hook is made with the outline shown in the last-named figures, so as to insure the proper working of the surface in question when in contact with the surface $l^2$ of the lock L. The surface $c^7$ of the tail of the hook has preferably the form shown in the drawings, Figs. 4 and 5, as the arm $c'$ is thereby best fitted to engage with and be held by the locking-face of the lock L.

The coupling-hook C is pivoted in the left-hand member of the draw-bar A by means of the shaft D. This shaft is sustained in place by a head that rests on the upper surface of A.

The shaft D is provided with a projecting tongue situated midway between its upper and lower ends, and which tongue is of the same length as the perforation in the part $c'$ of the hook C. At the side of this perforation nearest the tail $c'$ is a slot into which the tongue fits, Fig. 5. The upper part of the left-hand member of the draw-bar is also slotted at one side of its perforation, which thus allows the projecting tongue of the shaft D to enter and the shaft to be slipped and keyed into its proper position in the part $c'$. Thus the hook C is keyed on the shaft D, and the shaft D, when the hook C turns laterally from one to the other of the two positions in which it is shown in Fig. 4, is turned accordingly, and to the extent indicated revolves in its bearings in the left-hand members of the draw-bar; or when the shaft D revolves by the action of the spring M, hereinafter mentioned, the hook C moves with it and is thrown open to the limit of its revolution. When placed as shown in the draw-head on the right in Fig. 4, the hook is unlocked and open to make a coupling. In the draw-head on the left in Fig. 4 the hook is shown closed and locked; but it is nevertheless in position to couple with an opposing hook set in the position shown in the right of the figure. Moreover, both hooks may be unlocked, and each in the position shown in the right of Fig. 4, and yet a coupling will be effected when the opposing draw-heads encounter each other.

When one of the hooks is unlocked and the other locked, the point of the unlocked hook encounters the concavity of the shoulder B of the opposing draw-bar, and is thereby guided along the concave recess of that draw-bar and swung into engagement with the point of the locked hook at the same time that the tail (or arm $c'$) of said unlocked hook is thrown back into the recess $a'$ of its draw-bar and caught and held by the lock L thereof.

When both hooks are unlocked and open, the point of each hook encounters the concavity of the shoulder B of the opposing draw-bar, and both hooks are turned into engagement one with the other, each being at the same time locked in the manner aforesaid.

The recess $a'$ in the pivot side of the draw-bar is shaped and extended back into the draw-bar, so as to receive into itself the tail of the coupling-hook, and to suitably guide and limit the movement of the lock L as it turns from one to the other of the two positions in which said lock is shown in Fig. 4.

The lock L is hook-shaped, as shown. It is strongly made in one piece, and is fixed on a vertical shaft, $l$, which shaft where said lock is seated on it is square. The surface $l^2$ of the lock is rounded, so as to insure a smooth and otherwise satisfactory working of the lock when brought into contact with the face $c^6$ of the tail of the coupling-hook. The shaft $l$, to which the lock L is fixed, is extended below the draw-bar, and then bent so as to form a crank, $l^3$, Figs. 2 and 3. By turning this crank from the position shown by full lines in Fig. 2 to the position indicated by broken lines the lock L is moved from the position occupied by it in the draw-head on the left of Fig. 4 into the position occupied by it in the other draw-head in that figure, or from the position occupied by it when locking the coupling-hook into position for the release of coupling-hook. One coupling-hook being thus released, the draw-heads are free to separate on withdrawal of one car from the other.

The shaft $l$ is sustained in place by a nut properly locked that rests on the upper surface of the draw-bar, as at $l$, Fig. 1. The lock L has in its inferior surface a pin, $l^4$, Figs. 2 and 4, that, with the movement of the lock, travels along a curved slot, $a^3$, formed in the bottom shell of the draw-bar. This pin extends through the slot somewhat beyond the inferior surface of the draw-bar, and is finished with an eye, as shown in Fig. 3. The shaft D, to which the coupling-hook C is keyed, as aforesaid, likewise extends below the lower surface of the draw-bar, and has in it without the draw-bar a pin or staple, $d$, Fig. 2, serving as a lever, by means of which the shaft D, with the attached coupling-hook C, may be rotated. The pin $l^4$, without the draw-bar, is connected with said lever $d$ by the coiled spring M, Figs. 2 and 3.

When, for the purpose of effecting uncoupling, the lock L is by a movement, as aforesaid, of the crank $l^3$ withdrawn from its engagement with the arm $c'$ of the coupling-hook, (shown in the left-hand draw-head in Fig. 4,) and turned in the position that it is shown to have in the right-hand draw-head in that figure, the spring M is extended and acts strongly, through the lever $d$, to turn the coupling-hook into the position that said hook has in the right-hand draw-head in Fig. 4, in which position one, at least, of the opposing hooks must be in order to effect another coupling. The uncoupling having been effected, as described, if the crank $l^3$ be then released, the spring M acts through the pin $l^4$ to turn the lock back to the position that it has in the left-hand draw-head in Fig. 4, in which position it is ready to effect another coupling.

While the crank $l^3$ is held in the position indicated by dotted or broken lines in Fig. 2, the attached lock is held, as shown, in the right-hand draw-head in Fig. 4, and with its lock in that position a coupler will not act to couple. Thus when, as is often the case in practice, cars are brought together without intent to couple them, the crank $l^3$ is to be held as shown by the broken lines aforesaid, or that crank, in one of two opposing couplers, is to be held in the position indicated. There is no necessity for such retention of the lock in both of two such couplers. If the lock of one of the two be held as described, the lock of the other may be engaged with its coupling-hook, or not. The coupling will not be effected while either lock is held by its crank, as aforesaid.

The crank $l^3$ may be operated by means of a rod, as N, Figs. 2 and 3, one end of it being slotted (so as not to interfere with the slack motion before mentioned) and embracing the crank, and the other end placed so that a person standing at the corresponding corner of the car may easily reach it. This rod, or any equivalent appliance used to operate the crank, should be fitted so that it may be fixed to hold said crank in the position indicated by the dotted lines in Fig. 2, or released so as to release the crank, and thereby deliver the lock to the action of the spring M, before described.

The aim and effect of the application of the spring M, and combination of that spring, and the parts by it connected, as described, is the automatic resetting of the hook and lock of the coupler, (or the hook only, as desired,) in position for effecting another coupling, that follows the completion of an act of uncoupling; and this automatism, not heretofore existing in any coupler of the class to which my said coupler belongs, is a very desirable quality in such a coupler and is an important feature of my said invention.

I am aware of the public use heretofore of car-couplers in which a pivoted member rotating laterally operates in association with a latch or sliding block to effect a coupling with an opposing coupler of like structure; and I do not broadly claim as of my invention that method of coupling wherein such pivoted laterally-rotating arm or hook operating in association with a latch or sliding block is used for the purpose above named; nor would such a sliding block answer my purpose. It requires a peculiarly-shaped recess for the block to travel in, which is apt to become filled with obstructions and impede the action of the block. There must be a shoulder or wall on the outer side of the block to sustain the thrust of the inner arm of the hook, which shoulder or wall is liable to become irregularly worn away, and eventually destroy the efficacy of the lock.

In the present instance the lock, being allowed to play freely in the recess in the draw-bar, is in no danger of being obstructed. The strain from the draw-bar hook is transmitted through the locking-hook directly to the journal of the shaft that holds the lock, and the wear upon all parts of the locking apparatus is evenly distributed and keeps them always in their proper relation to each other, and no amount of wear (unless they are worn entirely away) will destroy their correct mechanical action.

In order that the buffer or part B of my draw-bar shall receive with least possible shock and smoothly guide into its seat the coupling-hook C, when said hook is open and presented to the buffer in that condition, as indicated in Fig. 4, the concavity of the part B is given the contour shown in Figs. 1, 2, and 4, respectively.

I claim—

1. The combination of the draw-bar A, the fixed rods F F, the plates I I', adapted to be slipped on said rods, the spring K, the brackets G H, and the car-body E, substantially as described.

2. The combination of the car-body E, the cross-timber $e$, the fixed rods F F, and the brackets G H, as and for the purpose of holding the draw-bar.

3. The combination of the part $a$, the hook C, the shafts D $l$, the lock L, and the spring M, said spring at one end being connected with a crank upon said shaft D and at the other end directly with said lock, substantially as described.

4. The combination of the draw-bar having the buffer B, and the pivoted hook C, with the rod J, the plates I I', the fixed rods F F, the spring K, the car-body E, and the brackets G H, said plates I I' and spring K being adapted to be slipped on said fixed rods, substantially as described, and for the purpose of automatically resetting the hook and lock.

5. The combination of the spring M, the pin $l^4$, fixed in the lock L, the shaft $l$, the crank $l^3$, the pin or staple $d$, fixed in the shaft D, the shaft D, to which the coupling-hook C is keyed, and the coupling-hook C, substantially as shown and described, and for the purposes set forth.

MADISON J. LORRAINE.

Witnesses:
EDGAR MILLER,
L. D. MOODY.